United States Patent Office 2,949,354
Patented Aug. 16, 1960

2,949,354

METHOD AND COMPOSITION FOR THE CONTROL OF UNDESIRED VEGETATION

Charles W. Todd, Thornbury Township, Delaware County, Pa., assignor to E. I. du Pont de Nemours and Company, Wilmington, Del., a corporation of Delaware No Drawing. Filed Aug. 24, 1956, Ser. No. 605,946

6 Claims. (Cl. 71—2.7)

This invention relates to herbicidal compositions and methods employing certain polyfluorocarboxylic acid compounds as active ingredients.

I have found that certain polyfluorocarboxylic acid compounds possess outstanding herbicidal activity. When employed in herbicidal compositions and methods, these compounds are outstandingly effective for the control of undesired vegetation.

The polyfluorocarboxylic acid compounds that have been found to possess outstanding herbicidal activity are those represented by the formula (1) 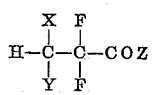

and the salts and esters thereof, wherein X is selected from the group consisting of fluorine and chlorine, Y is selected from the group consisting of hydrogen, fluorine, chlorine, monovalent alkyl groups, monovalent cycloalkyl groups, monovalent chloroalkyl groups and monovalent fluoroalkyl groups, and Z is hydroxyl or an unsubstituted or alkyl amide, that is an

group wherein $R^1$ and $R^2$ can be the same or different and are hydrogen or alkyl, preferably of less than 7 carbon atoms. Where Y is an alkyl, cycloalkyl, chloroalkyl or fluoroalkyl group, preferably Y contains less than 12 carbon atoms.

Where the active ingredient is a salt of the polyfluorocarboxylic acid, ordinarily it is a salt formed by replacement of the acid hydrogen with a metallic cation such as $Na^+$, $K^+$, $Li^+$, $Mg^{++}$, $Ca^{++}$, $Cu^{++}$, $Zn^{++}$, $Fe^{+++}$; ammonia, or substituted ammonium, such as lower alkyl or substituted alkyl ammonium groups, and also the ammonium salts formed by complexing the free acid with ammonium compounds such as dimethylformamide. Where the carboxylic compound is in the form of an amide, it can be either an unsubstituted amide or a substituted amide such as N,N-dimethylalkylamide. By way of example of esters of the active ingredients, they can be esters with isopropanol, butanol, tetrahydrofurfural, butoxypropanol, butoxyethoxypropanol, methanol, ethanol, ethylene glycol and glycerol.

The polyfluorocarboxylic acid compounds used in the compositions and methods of the present invention can be prepared by any conventional means. Thus, they can be prepared by reacting a polyfluoroethylene with an alcohol that contains a non-aromatic carbon atom bearing a hydroxyl group and a hydrogen atom directly attached thereto and in which all of the non-aromatic carbon atoms are saturated. This reaction produces a polyfluoro alcohol that can be oxidized with a permanganate to form the polyfluorocarboxylic acids used in the practice of the present invention. This preparation can be represented by the following equation:

(2) 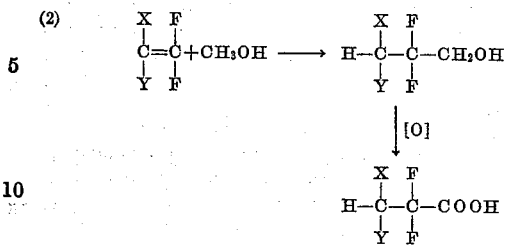

wherein X and Y have the same significance as in Formula 1 above. For a detailed description of the various steps of this preparation, see Joyce, Jr., U.S. Patent No. 2,559,628, which shows the reaction of the polyfluoroethylene with the alcohol, and Berry, U.S. Patent No. 2,559,629, which describes the oxidation of an alcohol intermediate with a permanganate to form the carboxylic acid.

The salts, esters and amides of these polyfluorocarboxylic acids can be prepared in the conventional manner. Thus the salts can be prepared by neutralization of the acids with the appropriate hydroxide, carbonate, or amine. The esters can be prepared by common esterification methods of reacting an alcohol with the acid and heating. The amides can be prepared by heating the ammonium salt of the acid. Also the acyl halide of the acids can be heated with the dialkylamines.

The salt complexes such as those formed with dimethylformamide can be prepared by refluxing the acid with more than a molar equivalent of dimethylformamide and then distilling off the excess dimethylformamide and any solvent used. The resulting material is an acid-dimethylformamide complex of a 1:1 mol ratio, much like the conventional ammonium salts of the polyfluorocarboxylic acids.

Illustrative of the compounds useful in the practice of the present invention are the following:

2,2,3,3-tetrafluoropropionic acid
3-chloro-2,2,3-trifluoropropionic acid
3,3-dichloro-2,2-difluoropropionic acid
2,2,3-trifluorobutyric acid
3-chloro-2,2-difluorobutyric acid
2,2,3-trifluoropentadecanoic acid
2,2,3-trifluoro-3-cyclohexylpropionic acid
2,2,3,3-tetrafluoropropionamide
2,2,3,3-tetrafluoropropionic acid 1:1 complex with dimethylformamide
2,2,3,3-tetrafluoropropionic acid, sodium salt
2,2,3,3-tetrafluoropropionic acid, dimethylamine salt
2,2,3,3-tetrafluoropropionic acid, ethyl ester
2,2,3,3-tetrafluoropropionic acid, p-chloroaniline salt
2,2,3,3-tetrafluoropropionic acid, monomethylamine salt
2,2,3-trifluorobutyric acid, dimethylamine salt
2,2,3-trifluoro-3-cyclohexylpropionic acid, diethylamine salt
2,2,3,3-tetrafluoro-N-methylpropionamide
2,2,3,3-tetrafluoro-N,N-dimethylpropionamide
3-chloro-2,2,3-trifluoro-N,N-diethylpropionamide The compounds can be applied in any of a variety of compositions. Thus those that are sufficiently water soluble can be applied simply in water solution. It is preferred however that the compounds be extended with a carrier material or conditioning agent of the kind used and commonly referred to in the art as a herbicidal adjuvant or modifier. Such adjuvants are inert solids, surface-active agents and organic liquids.

The compounds shown above will be included in such compositions in sufficient amount so that they can exert a herbicidal effect. Usually from about 1 to 95% by weight of the compounds are included in such formulations.

Solids formulations can be prepared with inert powders. The formulations thus can be homogeneous powders that either can be used as such, diluted with inert solids to form dusts, or suspended in a suitable liquid medium for spray application. The powders usually comprise active ingredient admixed with minor amounts of conditioning agent. Natural clays, either absorptive such as attapulgite or relatively nonabsorptive such as china clays, diatomaceous earth, walnut shell flour, redwood flour, synthetic fine silica, calcium silicate and other inert solid carriers of the kind conventionally employed in powder fungicidal compositions can be used. The active ingredient usually makes up from about 25–90% of these powder compositions. The solids ordinarily should be very finely divided and should have a particle size below about 50 microns and preferably below about 20 microns. For conversion of the powders to dusts, talc, pyrophyllite, tobacco dust, volcanic ash and other dense, rapid-settling inert solids customarily are used.

If the active compound used is water soluble, it can be sprayed or in any other desired manner applied to an absorptive powder which can then be dried to produce a dry product. Any of the above absorptive materials can be used for the preparation of such products.

Liquid compositions including the active compounds above described can be prepared by admixing the compound with a suitable liquid diluent medium. The active compound can be either in solution or in suspension in the liquid medium. Typical of the liquid media commonly employed are kerosene, Stoddard solvent, xylene, alcohols, alkylated naphthalene, glycols and ketones such as diisobutyl ketone, cyclohexanone, etc. The active ingredient usually makes up from about 0.5 to 50% of these liquid compositions. Some of these compositions are designed to be used as such, and others to be extended with large quantities of water.

Compositions in the form of wettable powders or liquids can also include one or more surface-active agents such as wetting, dispersing or emulsifying agents. Thus mixtures of the above liquids with the active compounds can contain an emulsifying agent to make an emulsifiable oil composition. The surface-active agents cause the compositions of the liquid or dry to disperse or emulsify easily in water to give aqueous sprays.

The surface-active agents employed can be of the anionic, cationic or nonionic type. They include, for example, sodium oleate, sulfonated petroleum oils, alkyl aryl sulfonates, sodium lauryl sulfate, polyethylene oxides, lignin sulfonates, and other surface-active agents. A detailed list of such agents is set forth in an article by McCutcheon in "Soap and Chemical Specialties," volume 31, No. 7, pages 50–61; No. 8, pages 48–61; No. 9, pages 52–67; and No. 10, pages 48–67 (1955).

The compounds can be applied in compositions of the types shown in Jones U.S. Patent 2,412,510 in which an active compound of the invention replaces the active materials of that patent in the composition shown and in like amounts. Similarly any of the carriers, additives or surface-active agents there named or referred to can be used.

The herbicidal method of the present invention comprises applying a substituted polyfluorocarboxylic acid compound of Formula 1, ordinarily in a herbicidal composition of the aforementioned type, to the locus or area to be protected from undesirable plant growth. The active compound is, of course, applied in amount sufficient to exert the desired herbicidal action. The application can be made directly upon the locus or area and the vegetation thereon during the period of infection. Preferably, however, the substituted polyfluorocarboxylic acid compound is applied directly to the soil prior to weed infestation, that is, as a pre-emergence treatment. When used in this way it may be desirable to include a fertilizer or another soil pesticide, such as soil fungicide or nematocide.

In order that the invention can be better understood, the following examples are given in addition to those set forth above:

Example 1

The following wettable powder herbicidal compositions are prepared by the conventional techniques of combining the dry ingredients, blending in a ribbon blender, micropulverizing in a hammer mill until substantially all of the composition is below 50 microns in particle diameter, and reblending in a ribbon blender to give a free flowing powder that is readily dispersible in water to form dilute sprayable formulations:

A

| | Percent |
|---|---|
| 2,2,3,3-tetrafluoropropionic acid, methyl ester | 25 |
| Calcium silicate | 73.75 |
| Alkyl aryl sulfonate | 1.0 |
| Methyl cellulose | 0.25 |

B

| | |
|---|---|
| 3-chloro-2,2,3-trifluoropropionic acid, ammonium salt | 50 |
| Bentonite | 20 |
| Diatomaceous earth | 30 |

C

| | |
|---|---|
| 2,2,3,3-tetrafluoropropionamide | 50 |
| China clay | 48.75 |
| Alkyl aryl sulfonate | 0.75 |
| Polyvinyl alcohol | 0.5 |

D

| | |
|---|---|
| 2,2,3-trifluoro-3-cyclohexylpropionic acid | 80 |
| Synthetic silica | 18.5 |
| Sodium lauryl sulfate | 0.5 |
| Sodium phenol-aldehyde sulfonate | 1.0 |

E

| | |
|---|---|
| 2,2,3,3-tetrafluoropropionic acid dimethylamine salt | 50 |
| China clay | 49.5 |
| Polyvinyl alcohol | 0.5 |

These compositions are extended with water to form sprayable mixtures containing 1% by weight of the active ingredient. These are then sprayed at the rate of 30 pounds per acre of active ingredient by a compression-type sprayer onto mixed grasses growing on ditch banks in a sugar cane field. Outstanding herbicidal control is obtained.

Example 2

The following dust herbicidal compositions are prepared by first blending and grinding the active polyfluorocarboxylic acid compound with the minor adsorptive diluent until the active ingredient is reduced to a particle size substantially less than 50 microns, and then blending the resultant powder with the major diluent until a homogeneous dust formulation is obtained:

A

| | Percent |
|---|---|
| 2,2,3,3-tetrafluoropropionic acid, ethyl ester | 10 |
| Attapulgite, dry | 40 |
| Talc | 50 |

B

| | |
|---|---|
| 2,2,3-trifluorovaleric acid | 20 |
| Attapulgite, dry | 20 |
| Pyrophyllite | 60 |

C

| | |
|---|---|
| 3-chloro-2,2,3-trifluoropropionamide | 10 |
| Diatomaceous earth | 10 |
| Tobacco dust | 80 |

D

| | |
|---|---|
| 2,2,3,3-tetrafluoro-N-methylpropionamide | 10 |
| Diatomaceous earth | 10 |
| Talc | 80 |

These dust compositions, when applied by hand to mowed grass stubble in a warehouse area at the rate of ¼ pound of active ingredient per square rod, give excellent control of the undesirable grasses.

*Example 3*

The following emulsifiable oil compositions are prepared by combining an oil soluble polyfluorocarboxylic acid compound with an emulsifier and an oil carrier with agitation until solution is complete:

A

| | Percent |
|---|---|
| 2,2,3,3-tetrafluoropropionic acid, dodecyl ester | 25 |
| Polyethylene oxide modified sorbitan fatty acid ester | 5 |
| Aromatic herbicidal oil | 70 |

B

| | |
|---|---|
| 2,2,3-trifluorobutyric acid, isopropyl ester | 25 |
| Alkyl aryl polyether alcohol | 5 |
| Alkylated naphthalene | 70 |

C

| | |
|---|---|
| 2,2,3,3-tetrafluoro-N,N-dimethyl propionamide | 10 |
| Alkyl aryl polyether alcohol | 5 |
| Alkylated naphthalene | 85 |

One part of each of these oil solutions is emulsified in oil with a herbicidal oil to give compositions containing 2% by weight of the active ingredient. The remainder of each of these oil solutions is added to water with vigorous agitation to form mobile emulsions containing 2% by weight of the active ingredient. These sprayable compositions are then sprayed at the rate of 40 pounds per acre of the active ingredient onto grassy weeds growing along a railroad right-of-way. This treatment effects good weed control.

*Example 4*

The following aqueous solutions are prepared by slowly adding the water soluble polyfluorocarboxylic acid compound to water with agitation. A wetting agent is included in some of these compositions to reduce surface tension and to aid in coverage of the foliage to which the solution is applied.

A

| | Percent |
|---|---|
| 2,2,3,3-tetrafluoropropionic acid, ammonium salt | 25 |
| Water | 75 |

B

| | |
|---|---|
| 3-chloro-2,2,3-trifluoropropionic acid, dimethylamine salt | 25 |
| Sodium lauryl sulfate | 2 |
| Water | 73 |

C

| | |
|---|---|
| 3,3-dichloro-2,2-difluoropropionic acid, sodium salt | 25 |
| Sodium lauryl sulfate | 2 |
| Water | 73 |

D

| | |
|---|---|
| 2,2,3,3-tetrafluoropropionic acid, 1:1 complex with dimethylformamide | 25 |
| Sodium lauryl sulfate | 2 |
| Water | 73 |

These aqueous concentrates are diluted with water to an active ingredient content of 2% by weight and applied at the rate of 20 pounds per acre of active ingredient to quack grass growing along the edge of a cultivated field. Excellent kill of the quack grass is obtained.

I claim:

1. The method for the control of undesired vegetation comprising applying to the locus to be protected, in an amount sufficient to exert herbicidal action, a compound represented by the formula

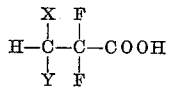

and the salts, esters, N-unsubstituted amides and lower alkyl amides thereof, wherein X is selected from the group consisting of fluorine and chlorine, and Y is selected from the group consisting of hydrogen, fluorine, chlorine, monovalent alkyl groups of less than 12 carbon atoms, monovalent cycloalkyl groups of less than 12 carbon atoms, monovalent chloroalkyl groups of less than 12 carbon atoms and monovalent fluoroalkyl groups of less than 12 carbon atoms.

2. The method for the control of undesired vegetation comprising applying to the locus to be protected in an amount sufficient to exert herbicidal action, 2,2,3,3-tetrafluoropropionic acid.

3. A herbicidal composition comprising an inert finely divided solid surface active agent and, in an amount sufficient to exert herbicidal action, a compound represented by the formula

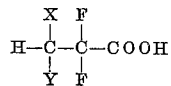

and the salts, esters, N-unsubstituted amides and lower alkyl amides thereof, wherein X is selected from the group consisting of fluorine, chlorine, and Y is selected from the group consisting of hydrogen, fluorine, chlorine, monovalent alkyl groups of less than 12 carbon atoms, monovalent cycloalkyl groups of less than 12 carbon atoms, monovalent chloroalkyl groups and monovalent fluoroalkyl groups of less than 12 carbon atoms.

4. A herbicidal composition comprising an inert powder adjuvant, and in an amount sufficient to exert herbicidal action, a compound represented by the formula

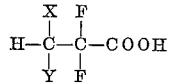

and the salts, esters, N-unsubstituted amides and lower alkyl amides thereof, wherein X is selected from the group consisting of fluorine, chlorine, and Y is selected from the group consisting of hydrogen, fluorine, chlorine, monovalent alkyl groups of less than 12 carbon atoms, monovalent cycloalkyl groups of less than 12 carbon atoms, monovalent chloroalkyl groups and monovalent fluoroalkyl groups of less than 12 carbon atoms.

5. A herbicidal composition comprising an inert finely divided solid surface active agent and in an amount sufficient to exert herbicidal action, 2,2,3,3-tetrafluoropropionic acid.

6. A herbicidal composition comprising an inert powder adjuvant, and in an amount sufficient to exert herbicidal action, 2,2,3,3-tetrafluoropropionic acid.

References Cited in the file of this patent

UNITED STATES PATENTS

| | | |
|---|---|---|
| 2,559,630 | Bullitt | July 10, 1951 |
| 2,642,354 | Barrons | June 16, 1953 |
| 2,649,365 | Raynor et al. | Aug. 18, 1953 |
| 2,802,028 | England | Aug. 6, 1957 |
| 2,807,530 | Barrons | Sept. 24, 1957 |

OTHER REFERENCES

Barrons et al., in "Down to Earth," a Dow Chemical Co., publ., Midland, Michigan, Winter 1954, p. 16.

Pattison, in "Chemical Abstracts," vol. 48, col. 6022(f), 1954.

Beilstein: "Organische Chemie," Band II, Vierte Auflage, 1942, System No. 162, page 228.